United States Patent [19]
Branneman

[11] Patent Number: 6,058,642
[45] Date of Patent: May 9, 2000

[54] LIGHTWEIGHT RETRACTABLE HAND HELD NET

[76] Inventor: Jeffrey L. Branneman, 6805 E. County Rd. 1000 S., Cloverdale, Ind. 46120

[21] Appl. No.: 09/371,732

[22] Filed: Aug. 10, 1999

[51] Int. Cl.[7] .................................................. A01K 77/00
[52] U.S. Cl. ..................................................... 43/12
[58] Field of Search ........................................... 43/12, 11

[56] References Cited

U.S. PATENT DOCUMENTS

| | | | |
|---|---|---|---|
| 440,568 | 11/1890 | Hebard | 43/12 |
| 1,668,835 | 5/1928 | Allen | 43/12 |
| 2,354,942 | 8/1944 | Chapman | 43/12 |
| 2,619,755 | 12/1952 | Henson | 43/12 |
| 2,683,949 | 7/1954 | Berezansky | 43/12 |
| 4,446,646 | 5/1984 | Van Veld | 43/12 |
| 4,706,404 | 11/1987 | Kun | 43/12 |

*Primary Examiner*—Jack W. Lavinder
*Attorney, Agent, or Firm*—Locke Reynolds LLP

[57] ABSTRACT

This invention provides collapsible hand held net comprising a tubular member having a distal end and a proximal end, and including a linear longitudinal slot. A sleeve is movably situated within the tubular member and a pair of net support arms is mounted to a distal end of the sleeve. A fishing net is coupled to the support arms. A pin is fixed to the sleeve and engaged within the linear longitudinal slot for controlling the extent of linear movement of the sleeve with respect to the tubular member. A rod is provided and movably situated within the tubular member and penetrating the sleeve. A pair of connecting bars is connected to a distal end of the rod, each connecting bar being connected to one of the net support arms. A dowel is fixed to the rod extending through the linear longitudinal slot. A handle is fixed to the dowel on the outside of the tubular member whereby linear movement of the handle relative to the tubular member causes displacement of the rod and sleeve with respect to the tubular member between a rearmost position wherein the net support arms and net are situated within the tubular member and a foremost position wherein the net support arms protrude from the sleeve and are deployed laterally by a forward displacement of the rod with respect to the sleeve.

20 Claims, 8 Drawing Sheets

LIGHTWEIGHT RETRACTABLE HAND HELD NET

BACKGROUND OF THE INVENTION

The present invention relates generally to fishing nets and nets of the type used by fishermen, hunters, collectors and the like to capture small mobile animals and aquatic creatures. More particularly, this invention relates to a net assembly that is lightweight, quickly deployable, and resistant to accidental snagging when the net is in storage or transport.

DESCRIPTION OF THE PRIOR ART

It has long been recognized that a need exists for a portable means for capturing mobile animals and aquatic creatures. Such creatures often are found in remote locations that are accessible only by foot or small boat. This has created a need for a creature capturing device that can effectively capture and hold a creature, and yet is easily transported to remote locations.

The most common capture device is the hand held net. This device involves a flexible net for surrounding and entangling the creature and a net support structure to hold the net in an open position and to support the weight of both the net and the captured creature. In their most simple embodiment, the hand held nets of the prior art have comprised a rigid net support structure having a handle at one end and a pair of opposed net support arms at an opposite end. In this embodiment, the net is simply secured between the net support arms creating a net opening space which can be maneuvered to capture the animal.

Striking an effective balance between the usefulness of the net and the portability of the net has long been a challenge to designers of such hand held nets. Generally speaking, a broad net opening is preferred because it is more likely to capture the animal or creature. However, increasing the size of a net opening increases the difficulties of transporting the net. To create a broad opening, the net support arms must be distant from each other. Where the net support arms are fixed in relation to each other, providing a broad opening creates a large net profile. This makes transport difficult by increasing the probability that the net or net supports will be damaged or snagged by incidental contact with foliage, structures or other equipment during portage to the fishing or hunting destination. This also makes the hand held net more difficult to store on a small fishing boat. These storage difficulties can lead the user of the net to store other equipment on top of the net making the net difficult to access and more prone to damage. This has led many fishermen to forego the use of this type of net.

Thus, it is an object of this invention to provide a hand held net that is easy to transport, provides a substantial net opening and protects the net from damage or snagging when it is not in use while still allowing rapid deployment of the net.

Hand held nets have also been developed with collapsible net supports. However, striking the appropriate balance between functionality and portability has not yet been achieved. Many of these designs utilize a tubular handle structure having an exterior to which collapsible net supports are affixed. These designs vary, but in each of these, the net supports and net are, at all times stored on the exterior of the hand held net. This exposes the net, the net support arm retraction mechanisms and the net support arms to damage and entanglement through incidental contact with foliage, structures and other equipment.

Thus, it is also an object of this invention to provide a hand held net that does not expose the net, net supports or a net supports retraction mechanism to damage or entanglement during transport.

At least one inventor has attempted to solve this problem by retracting the net, net support arms and net support retraction mechanism within the handle structure of the net. Kun, U.S. Pat. No. 4,706,404 discloses a collapsible net assembly actuated by two pipes joined by a groove and pin connection. As the pipes are twisted relative to each other, the net support arms are deployed or retracted thrusting the net supports out of or into one of the pipes. This design, however, requires the user to devote two hands to the task of expanding the net. This is a substantial limitation for a fishing net as, in most cases, when a fisher needs to use her net, she usually has at least one hand occupied with the fishing pole.

Thus, it is an object of this invention to provide a hand held net that is protected from damage or entanglement during transport and that can be deployed using only one hand.

Furthermore, it is often difficult to anticipate the precise time at which it may be necessary to use the net to capture an animal or aquatic creature. Thus, it is also important that a net be capable of rapid deployment. This cannot be accomplished using twist action deployment. Accordingly, the user of the Kun net must either pre-deploy the net once that she travels to the fishing or hunting destination creating short term storage problems or must risk not being able to deploy the net in a timely fashion.

The two pipe construction and the octagonal net supports evidenced in Kun also add unnecessary structural weight to the hand held net that increases the difficulties associated with transporting the net.

Thus, it is a further object of this invention to provide a hand held net that is protected from damage or entanglement, yet is lightweight and permits the user to rapidly deploy the net.

SUMMARY OF THE INVENTION

This invention provides collapsible hand held net comprising a tubular member having a distal end and a proximal end, and including a linear longitudinal slot. A sleeve is movably situated within the tubular member and a pair of net support arms is mounted to a distal end of the sleeve. A fishing net is coupled to the support arms. A pin is fixed to the sleeve and engaged within the linear longitudinal slot for controlling the extent of linear movement of the sleeve with respect to the tubular member. A rod is provided and movably situated within the tubular member and penetrating the sleeve. A pair of connecting bars is connected to a distal end of the rod, each connecting bar being connected to one of the net support arms. A dowel is fixed to the rod extending through the linear longitudinal slot. A handle is fixed to the dowel on the outside of the tubular member whereby linear movement of the handle relative to the tubular member causes displacement of the rod and sleeve with respect to the tubular member between a rearmost position wherein the net support arms and net are situated within the tubular member and a foremost position wherein the net support arms protrude from the sleeve and are deployed laterally by a forward displacement of the rod with respect to the sleeve.

In application, the linear nature of the longitudinal slot permits the user to rapidly open or close the tubular member by a simple longitudinal thrust of the handle relative to the tubular member. The linear longitudinal slot also provides important actuation control surfaces. These surfaces define the rearmost position and the position at which advancement of the rod relative to the sleeve to separate the net support arms becomes possible. This provides an inexpensive, and low profile means of mechanical control. It lowers the complexity of the hand held net, the weight of the hand held net and the overall size of the hand held net. Finally, because the device is actuated by a simple linear motion the user can use various anchor devices to rapidly deploy the net using only one hand.

Additional features and advantages will become apparent to those skilled in the art upon consideration of the following specification, which when taken in conjunction with the drawings, sets forth the preferred embodiment of the present invention. The embodiment of the invention disclosed herein is the best mode contemplated by the inventors for carrying out the invention in a commercial environment, although it should be understood that various modifications can be accomplished within the parameters of the present invention.

DESCRIPTION OF THE PREFERRED EMBODIMENTS

Turning now to FIGS. 1, 2, 3, 4, and 5 of the present application, there is shown a preferred embodiment of the hand held flexible net 1.

In the preferred embodiment, a pair of net support arms, 12 and 20, is provided. Each of the net support arms, 12 and 22, has a pivot end, 14 and 24 respectively, and a free end 16 and 26, respectively. Pivot ends 14 and 24 are connected to sleeve 40 by means of pivot pins 30 and 32. Pivot pins 30 and 32 are configured to permit the net support arms 12 and 22 to pivot between a deployed position and a storage position. In the deployed position, FIGS. 1 and 2, the net support arms 12 and 22 are separated from each other. In the storage position, FIGS. 4, 5, and 6 the net support arms 12 and 22 are held in close proximity to each other.

The preferred embodiment also includes a flexible net support 18, connected between the free end 16 of net support 12 and the free end 26 of net support 22. A net 10, depends from the net support arms, 12 and 22 and the flexible net support 18. When the net support arms 12 and 22 are positioned in the deployed position, the net 10 is open for creature capture. By utilizing a flexible net support 18, the risk of inadvertently forcing the quarry from the net opening is substantially reduced and the weight of the hand held net is also lowered.

The sleeve, 40, has two ends, a proximate end 42 and distal end 44. Distal end 44 is connected to the net support arms 12 and 22 and to pivot pins 30 and 32. The sleeve 40 features an interior chamber 46 defining an opening 48 at the proximate end of sleeve 40, and a second opening, 50, at the distal end 44 of sleeve 40.

As is shown in FIGS. 1, 3, 6 and 7, a tubular member, 60, is provided having two ends, a proximate end 62 and distal end 64. The tubular member 60 also has an interior chamber defining an opening at the distal end 64 of the tubular member 60. The interior chamber 66, of tubular member 60, is dimensioned to receive sleeve, 40, net support arms, 12 and 22, net 10, and flexible net support member 18, within the interior chamber of the tubular member 60, when net support arms 12 and 20, are arranged in a storage position, and sleeve 40 is fully retracted within the tubular member 60.

The tubular member 60, has an exterior surface 76, and, a linear longitudinal slot 70. The linear longitudinal slot 70 has two stops, a proximate stop 72, confronting the proximate end of the tubular member 60, and a distal stop 74, confronting the distal end 64 of tubular member 60.

A rod, 80, having a first end 82 and a second end 84 is slidably positioned within the interior chamber of the tubular member 60. The rod 80 penetrates the interior chamber 46 of the sleeve 40 and is dimensioned to permit the relative motion of the rod 80 and sleeve 40.

A pair of connecting bars 90 and 92 are also provided. Connecting bars 90 and 92 have two ends, a first end 94 and 98, respectively, and a second end 96 and 100. A thrust pivot pin 34, pivotally connects the first end, 94 of connecting bar 90 to the first end 98 of connecting bar 92 end to the second end 84 of rod 80. A first lateral pivot pin 36, pivotally connects the first end 94 connecting bar 90 to the net support arm 12. A second lateral pivot pin 38, pivotally connects the second end 100 of connecting bar 92 net support arm 22.

In the preferred embodiments, pins 38 and 36, are attached to net support arms 12 and 22 at a point disposed between the pivot ends 14 and 24 and the free ends 16 and 26 of the net support arms 12 and 22. Connecting bar 90, and connecting bar 92, are dimensioned so that relative motion of the first end 82 of the rod 80 toward the sleeve 40, causes net support arms 12 and 22, to move toward the deployed position from the storage position.

As is shown in FIGS. 1, 2, 6, and 7 a pin, 110, and a dowel, 112, are provided. The pin, 110, projects from the proximate end 42 of the sleeve 40 and extends into slot 70. The dowel 112 projects from the first end 82 of the rod 80 and extends into slot 70.

Also in the preferred embodiments, a handle 120 is fixed to the proximate end 62 of tubular member 60. Slide handle 122 is fixed to the dowel 112 to permit the user of the net hand held collapsible net 1 to slide the rod 80 from a position near the proximate end 62 of the tubular member 60.

Figure 1:
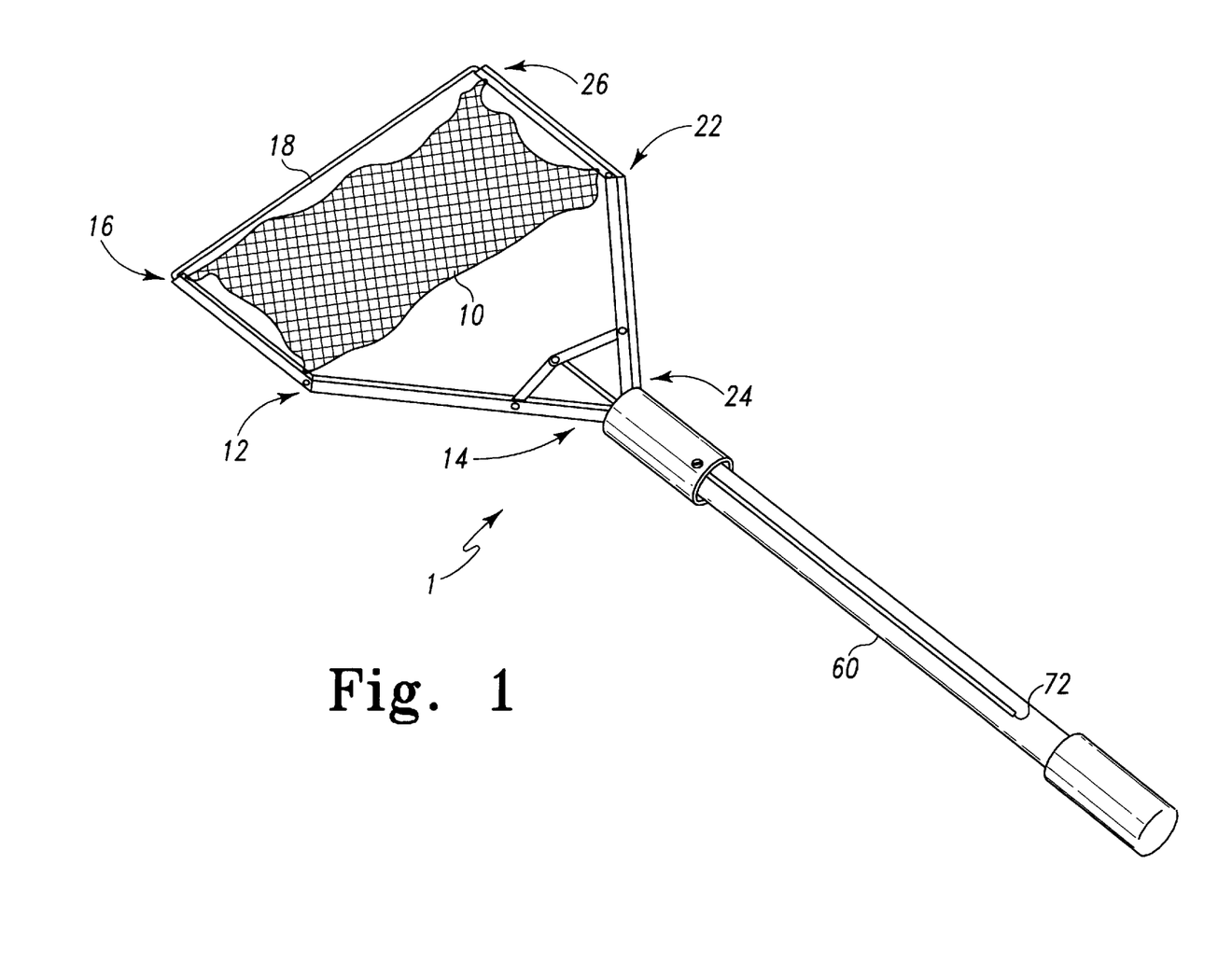
FIG. 1 depicts one first preferred embodiment of the hand held net of the present invention in its fully deployed, creature capture, configuration.
Figure 2:
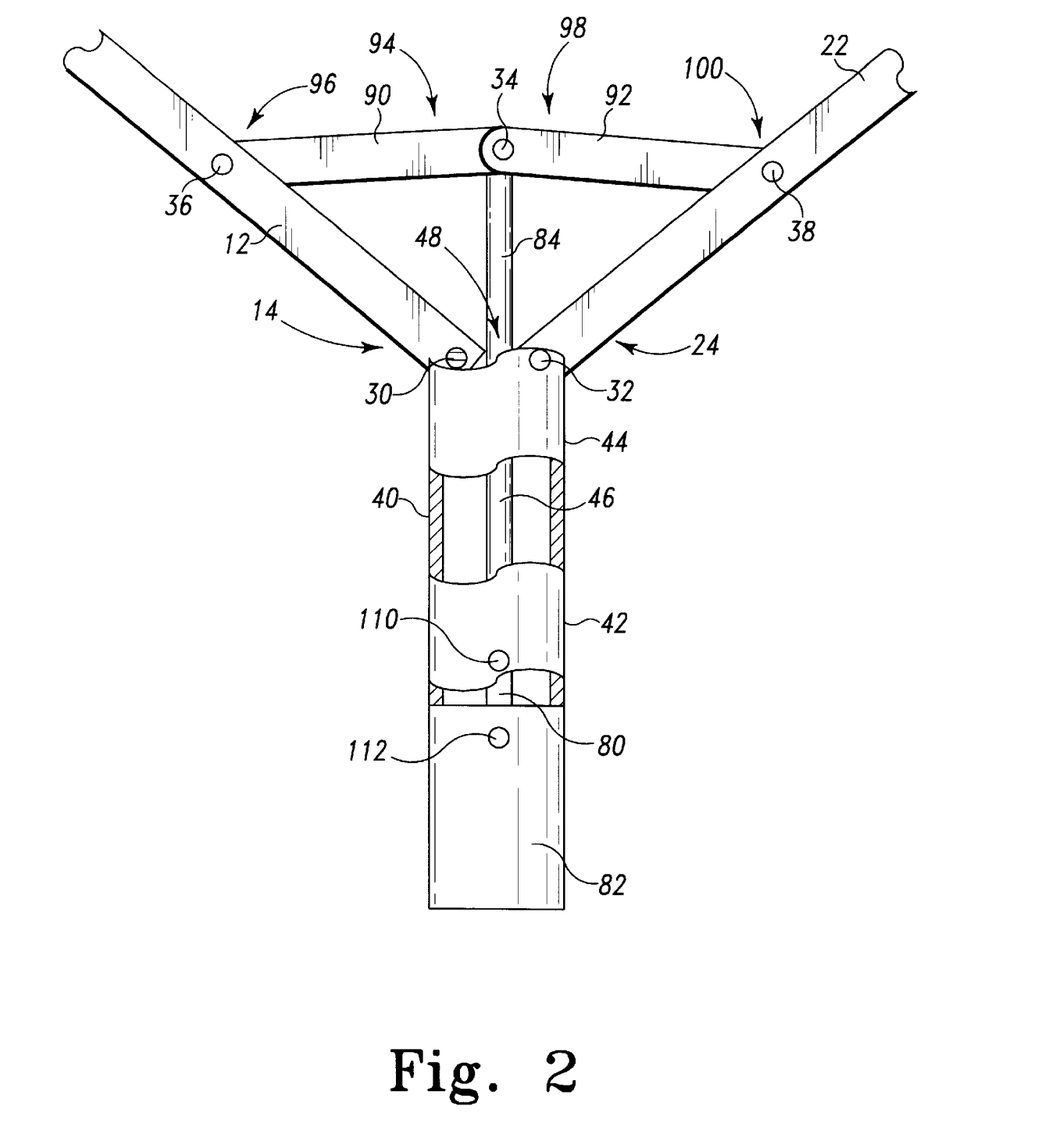
FIG. 2 depicts the relationship of the rod, sleeve, net support arms, and connecting bars as positioned when the net support arms are fully deployed.
Figure 3:
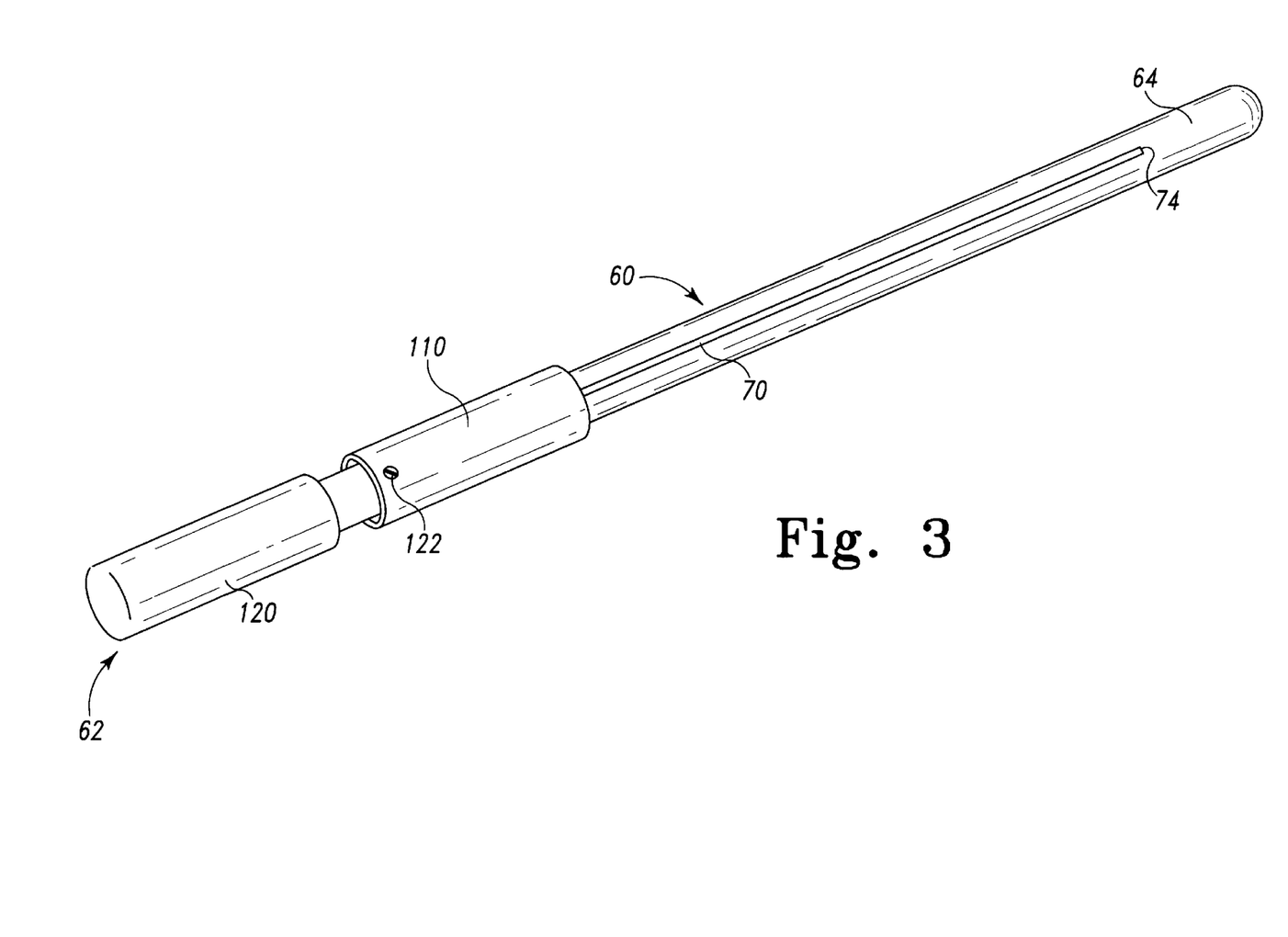
FIG. 3 depicts the tubular member, the handle and the slide handle.
Figure 4:
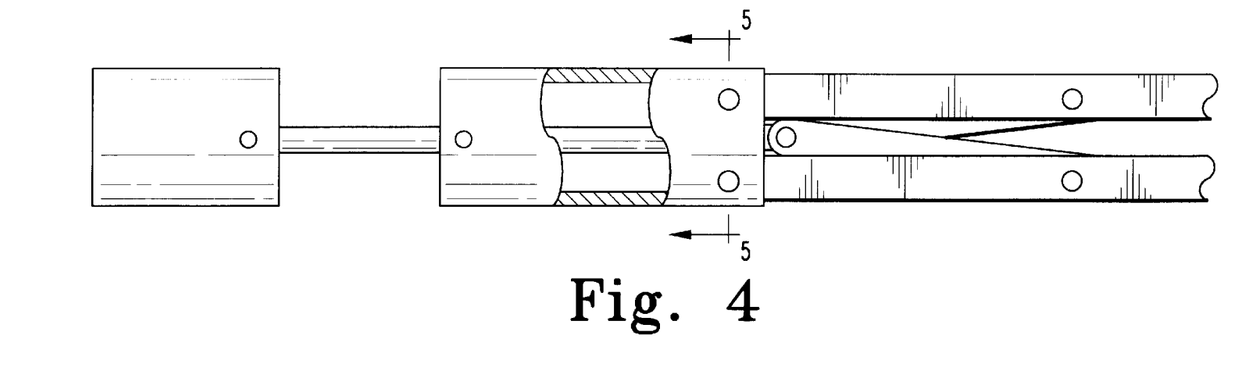
FIG. 4 depicts the net support arms, connecting bars, rod, and sleeve in the storage position.
Figure 5:
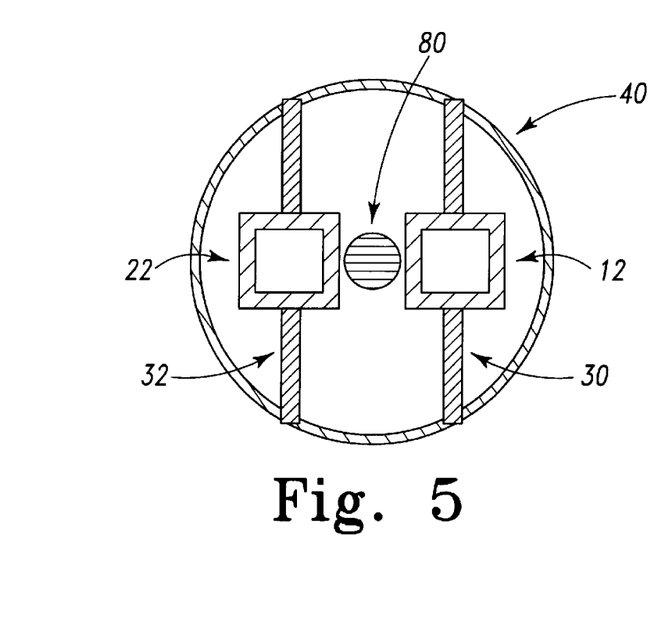
FIG. 5 depicts a cross section of the sleeve, net support arms, pivot pins and tubular member.
Figure 6:
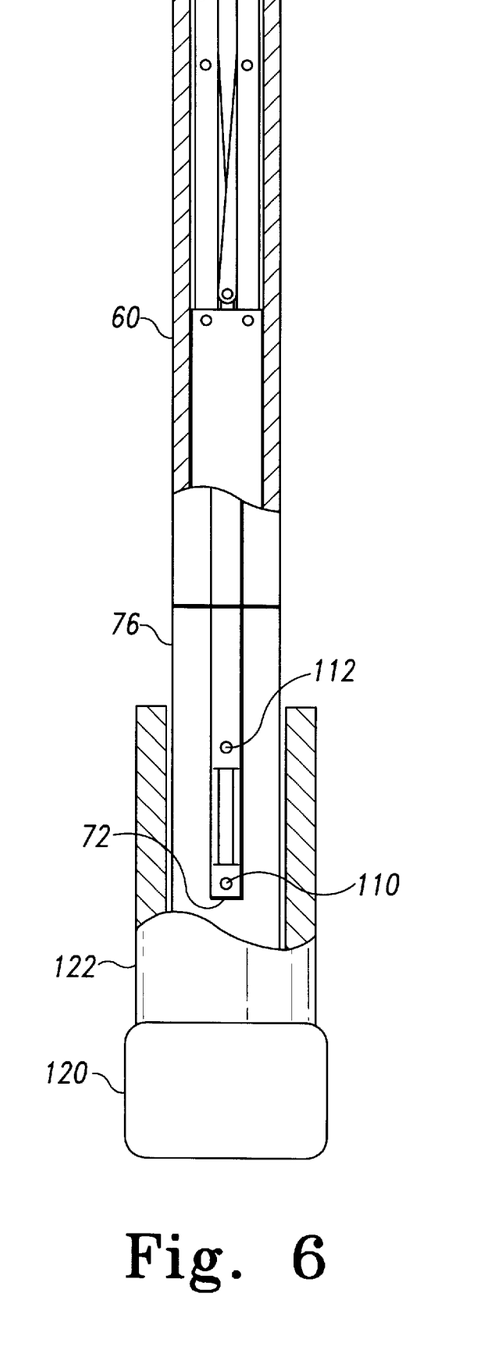
FIG. 6 depicts the hand held net, in partial section, when the net is arranged in the storage position.

FIG. 6 shows the hand held net of the present invention in its storage position. In this position, handle 122 is maintained near the proximal end 62 of the tubular member 60. The extent to which the rod 80 may be retracted from the distal end 64 of the slide tube 60 by means of the handle 122 is governed by the location of the pull stop 72. In practice, the tubular member 60 is dimensioned to fully contain the sleeve, 40, net support arms 12 and 22, net 10 and flexible net support 18 when the dowel 112 is positioned in contact with the pull stop 72.

The deployment of the net occurs in two phases. The first phase begins as depicted in FIG. 6, the dowel is advanced from the pull stop 72 toward the push stop 74. Because the net support arms cannot expand while they are positioned within the interior chamber 68 of the tubular member 60, the sleeve and the net support arms 12 and 22 are advanced toward the distal end 64 of the tubular member 60 as the rod is advanced to a position where the net support arms 12 and 22 can be separated to deploy the net 10. The tubular member is dimensioned so that when the pin 110 confronts the push stop 72, the sleeve 40, net support arms 12 and 22, net and flexible net support member 18 are positioned sufficiently outside of the tubular member 60 to permit the net support arms 12 and 22 to separate.

Figure 7:
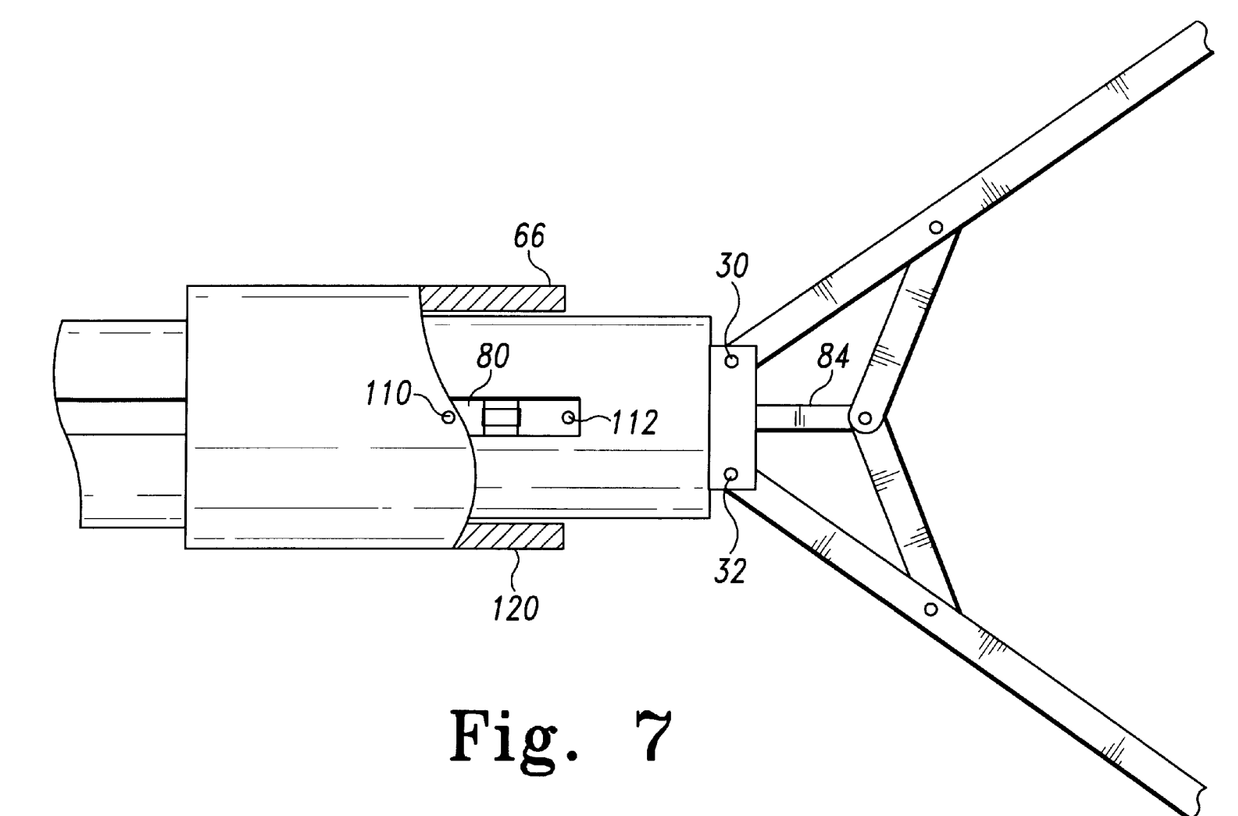
FIG. 7 depicts the hand held net, at the beginning of the second phase of deployment.

The second phase, FIG. 7, begins as the pin 110 confronts the distal stop 74. At this point, the rod 80 may be advanced relative to the sleeve 40 by further advancement of the handle 122 toward the distal end 64 of tubular member 60. Such relative motion of the rod 80 with respect to the sleeve 40 causes the net support arms 12 and 22 to separate. The extent to which the rod 80 can move toward the distal end 64 of the tube 60 is limited by engagement of the dowel 112 against the proximate end 42 of the sleeve 40. Alternatively, the first end 82 of rod 80 can be sized for engagement with the proximate end 42 of sleeve 40 to limit motion of the rod 80 towards the distal end of tubular member 60.

Thus, the hand held net 1 of the present invention permits the safe storage and rapid deployment of the net support arms 12 and 22, flexible net support 18, sleeve 40, and net 10 yet it is light weight and has a low profile to facilitate transport to the hunting or fishing destination.

In particular, the hand held net 1 of the claimed design represents a significant advancement over the device disclosed in Kun, U.S. Pat. No. 4,706,404 which increases the weight and profile of the device by requiring a two tube structure and which also adds weight and structure to one of the tubes in order to provide control surfaces for proper machine operation.

Figure 8:
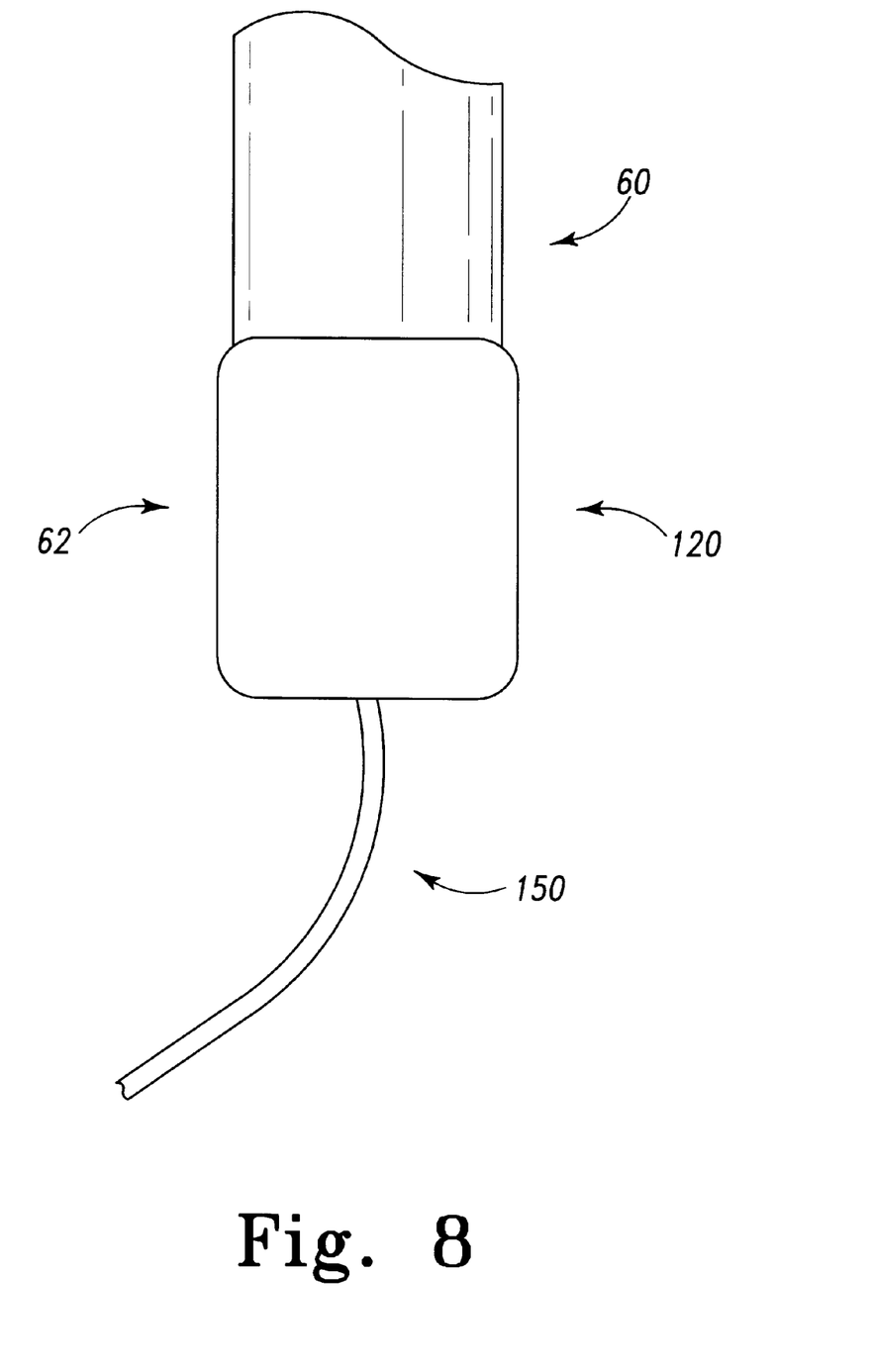
FIG. 8 shows an embodiment of an anchoring means to permit one handed deployment of the net.

The hand held net of the present invention also offers the advantage of one handed deployment. In one embodiment, handle 120 can further comprise an anchor system. Such an anchoring system may take the form of a bootstrap, FIG. 8. The anchoring system may also involve the use of magnet, suction device or Velcro™ system or any other device permitting the user to secure the proximate end 62 of the tubular member 60. With the proximate end 62 of the tubular member 60 secured, the user can actuate the net 10 with one hand 120 by advancing the pull handle 122 towards the distal end 64 of the tubular member 60.

Figure 9:
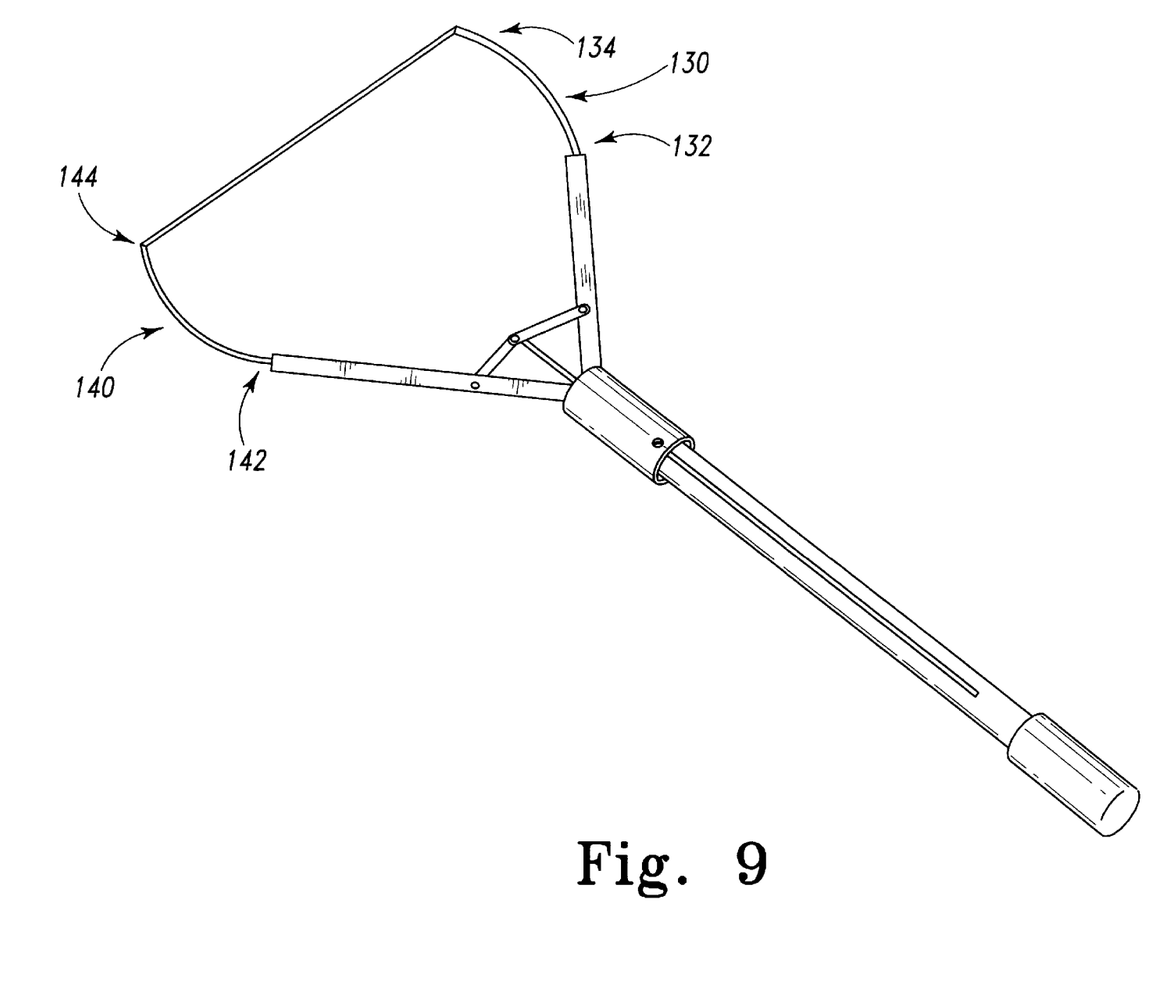
FIG. 9 shows one preferred embodiment of the invention having resilient net support ends.

Another preferred embodiment of this invention is shown in FIG. 9. FIG. 9 depicts the present invention as generally described above with the addition of a pair of resilient net support rods 130 and 140. Each of the resilient net support rods 130 and 140 have two ends, mounting ends 132 and 142 respectively and free ends 134 and 144 respectively. The mounting ends 132 and 142 of the resilient net support rods 130 and 140 are affixed to free ends 16 and 26 of the net support arms, 12 and 22. The free ends 134 and 144 of each resilient net support rod 130 and 140 are affixed to the flexible net support 18.

Either preferred embodiment of this simple system allows the net 10 to be rapidly deployed by a user with only one available hand. The system does not require the use of stored energy components, electrical/mechanical or chemical devices that may fail under field conditions. This too represents a substantial improvement over the prior art.

Having described the present invention in its preferred embodiments, it is clear that the present invention is susceptible to numerous modifications and embodiments within the ability of those skilled in the art and without exercise of the inventive faculty. Accordingly, the scope of the present invention is defined as set forth by the scope of the following claims.

What is claimed is:

1. A collapsible fishing net comprising:

a tubular member having a distal end and a proximal end, and including a linear longitudinal slot, a sleeve movably situated within the tubular member, a pair of net support arms mounted to a distal end of the sleeve, a fishing net coupled to the support arms, and a pin fixed to the sleeve and engaged within the linear longitudinal slot for controlling the extent of linear movement of the sleeve with respect to the tubular member, a rod movably situated within the tubular member and penetrating the sleeve, a pair of connecting bars connected to a distal end of the rod, each connecting bar being connected to one of the net support arms, a dowel fixed to the rod extending through the linear longitudinal slot, and a handle fixed to the dowel on the outside of the tubular member, whereby linear movement of the handle relative to the tubular member causes displacement of the rod and sleeve with respect to the tubular member between a rearmost position wherein the net support arms and net are situated within the tubular member and a foremost position wherein the net support arms protrude from the sleeve and are deployed laterally by a forward displacement of the rod with respect to the sleeve.

2. The collapsible fishing net of claim 1, wherein:

said linear longitudinal slot defines a proximate stop to engage said dowel limiting the motion of said handle in when it is advanced toward said proximate end of the tubular member to define said rearmost position.

3. The collapsible fishing net of claim 2, wherein:

said proximate stop is positioned relative to said distal end of said tubular member so that when said handle is advanced into said rearmost position, said net support arms and net are positioned within said distal end of said tubular member.

4. The collapsible fishing net of claim 2, wherein:

said linear longitudinal slot defines a distal stop to engage said pin and to limit the motion of said sleeve when said sleeve is advanced toward said distal end of said tubular member.

5. The collapsible fishing net of claim 4, wherein:

said distal stop is positioned relative to said distal end of said tubular member so that when said pin is brought into engagement with said distal stop, said net support arms are positioned for deployment.

6. The collapsible fishing net of claim 4, wherein:

said sleeve further provides a dowel engagement surface to limit motion of the dowel toward the distal end of the tubular member and to define said foremost position where said dowel engages said dowel engagement surface.

7. The collapsible fishing net of claim 6, wherein:

said dowel is positioned relative to said distal end of said rod so that said net support arms are deployed when said dowel engages said dowel engagement surface.

8. The collapsible fishing net of claim 6, wherein:
said dowel is positioned relative to said distal end of said rod so that said connecting rods are locked when the dowel engages said dowel engagement surface.

9. The collapsible fishing net of claim 6, wherein:
said dowel is positioned relative to said distal end of said rod so that said connecting bars are positioned normal to said rod when the dowel engages said dowel engagement surface.

10. The collapsible fishing net of claim 4, wherein:
each of said net support arms has a fixed end pivotally connected to said sleeve, and a free end.

11. The collapsible fishing net of claim 10, wherein:
each of said connecting bars has a first end pivotally connected to said distal end of said rod and each connecting bar has a second end pivotally connected to a net support arm at a position between the fixed end of the net support arm and the free end of the net support arm so that the relative motion of said distal end of said rod away from said sleeve deploys the net support arms.

12. The collapsible fishing net of any of claims 1–11, further comprising a flexible net support connected between said net support arms and fixed to said net.

13. The collapsible fishing net of any of claims 1–10, further comprising a flexible net support connected between the free end of the net support arms.

14. The collapsible fishing net of any of claims 1–11, further comprising an anchoring grip member fixed to said tubular member.

15. The collapsible fishing net of any of claims 1–11 further wherein said dowel is integral to said rod.

16. The collapsible fishing net of any of claims 1–11 further comprising a first resilient net support rod affixed to one of the net support arms and a second resilient net support rod affixed to another net support arm with each resilient net support rod and further comprising a flexible net support member between the resilient net support rods.

17. A collapsible fishing net comprising:
a tubular member having a distal end and a proximal end, and including a linear longitudinal slot, the slot having two ends, a proximal end defining a proximal stop and a distal end defining a distal stop;
a sleeve movably situated within the tubular member, a pair of net support arms mounted to a distal end of the sleeve, a fishing net coupled to the support arms, and a pin fixed to the sleeve and engaged within the linear longitudinal slot to confront the distal stop and limit the extent of linear movement of the sleeve with respect to the tubular member;
a rod movably situated within the tubular member and penetrating the sleeve, a pair of connecting bars connected to a distal end of the rod, each connecting bar being connected to one of the net support arms, a dowel fixed to the rod extending through the linear longitudinal slot to confront the proximal stop and limit the extent of linear movement of the rod with respect to the tubular member; and
a handle fixed to the dowel on the outside of the tubular member;
whereby linear movement of the handle relative to the tubular member causes displacement of the rod and sleeve with respect to the tubular member between a rearmost position wherein the net support arms and net are situated within the tubular member and a foremost position wherein the net support arms protrude from the sleeve and are deployed laterally by a forward displacement of the rod with respect to the sleeve.

18. The collapsible fishing net of claim 17 further comprising a first resilient net support rod affixed to one of the net support arms and a second resilient net support rod affixed to another net support arm further comprising a flexible net support member connected between the resilient net support rods.

19. A collapsible fishing net comprising:
a tubular member having a distal end and a proximal end, and including a linear longitudinal slot, the slot having two ends, a proximal end defining a proximal stop and a distal end defining a distal stop;
a sleeve movably situated within the tubular member, a pair of net support arms mounted to a distal end of the sleeve, a flexible member disposed between the net support arms, a fishing net coupled to the support arms and the flexible member; and
a pin fixed to the sleeve and engaged within the linear longitudinal slot to confront the distal stop and limit the extent of linear movement of the sleeve with respect to the tubular member;
a rod movably situated within the tubular member and penetrating the sleeve;
a pivot pin pivotally connected to a distal end of the rod;
a pair of connecting bars pivotally connected to the pivot pin each connecting bar being pivotally connected to one of the net support arms;
a dowel fixed to the rod extending through the linear longitudinal slot to confront the proximal stop and limit the extent of linear movement of the rod with respect to the tubular member;
a handle fixed to the dowel on the outside of the tubular member;
an anchoring grip fixed to the tubular member;
whereby linear movement of the handle relative to the tubular member causes displacement of the rod and sleeve with respect to the tubular member between a rearmost position wherein the net support arms and net are situated within the tubular member and a foremost position wherein the net support arms protrude from the sleeve and are deployed laterally by a forward displacement of the rod with respect to the sleeve.

20. The collapsible fishing net of claim 19 further comprising a first resilient net support rod affixed to one of the net support arms and a second resilient net support rod affixed to another net support arm with each resilient net support rod and further comprising a flexible net support member between the resilient net support rods.

* * * * *